No. 846,151.  
PATENTED MAR. 5, 1907.

G. F. SHAW.  
EXTENSION VEHICLE STEP.  
APPLICATION FILED APR. 21, 1906.

Witnesses  
Inventor  
George F. Shaw  
by Geo. H. Strong  
att'y.

THE NORRIS PETERS CO., WASHINGTON, D. C.

UNITED STATES PATENT OFFICE.

GEORGE F. SHAW, OF SAN FRANCISCO, CALIFORNIA.

EXTENSION VEHICLE-STEP.

No. 846,151.          Specification of Letters Patent.          Patented March 5, 1907.

Application filed April 21, 1906. Serial No. 313,036.

*To all whom it may concern:*

Be it known that I, GEORGE F. SHAW, a citizen of the United States, residing in the city and county of San Francisco and State of California, have invented new and useful Improvements in Extension Vehicle-Steps, of which the following is a specification.

My invention relates to a step for vehicles and means by which it may be extended for use and retracted at other times.

It consists in the combination of parts and in details of construction, which will be more fully explained by reference to the accompanying drawings; in which—

Figure 1:
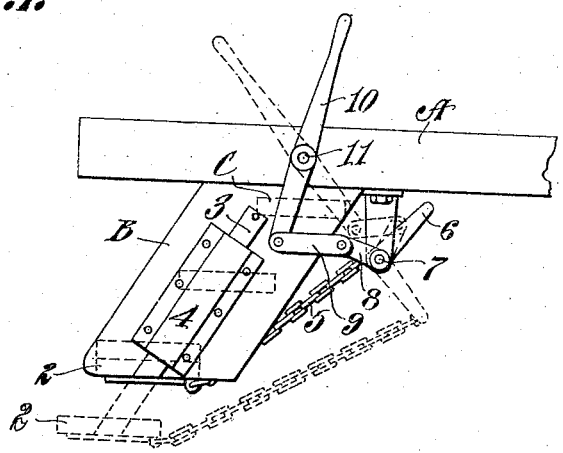
Figure 2:
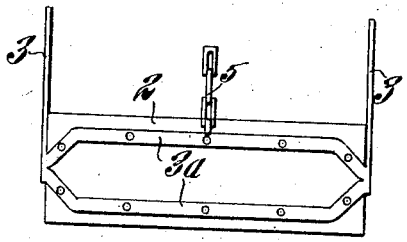

Figure 1 is a side elevation of a vehicle-step embodying my invention. Fig. 2 is a bottom plan view of extension-step.

Railway-carriages and some other vehicles are provided with steps extending downwardly from the platform or floor of the vehicle for the purpose of obtaining access thereto. The conditions under which such carriages move make it requisite to carry the steps well within the outer line of the carriage and a considerable distance above the ground. This distance is so great that it is difficult for heavy or infirm people to reach the lower step or to get down from it.

It is the object of my invention to provide a simple means for temporarily extending the steps and afterward retracting the extension into a safe position.

A indicates a platform of a carriage of this description; B, the side or stile of the steps, which is indicated in dotted lines at C.

In my invention I provide an additional step 2. This step is supported upon slidable bars 3, which are movable in guides 4, fixed to the sides B in which the permanent steps are carried. The guides and slides may be of any suitable or desired description. I prefer to make the bars 3 rectangular and of considerable width, so as to provide the requisite strength and stiffness to carry the step 2.

In order to fix the step firmly, the bars 3, being of sufficient width, may be split longitudinally and separated where they extend beneath the step 2, as shown at 3ª, and the separated bars 3ª are riveted or otherwise secured beneath the step 2, thus forming a sufficiently rigid support for it.

When free to move, the slides 3 are moved down in the guides 4 until they are checked by some suitable stop, which may be fixed to the upper end of the slides and abut against the upper end of the guides when the step is at its lowest point. In this position the step will be substantially in line with the permanent step and sufficiently low to be easily reached by passengers.

In order to retract the step, I have shown a flexible connection or chain, as 5, having one end connected with the step and the other with the crank-arm 6 carried by a shaft 7, this shaft having an arm 8, which stands at an angle with the arm 6, as shown.

9 is a link connecting the end of the crank-arm 8 with the lower end of the lever 10, which is fulcrumed at 11 to the platform or other convenient fixed part.

In operation the lever 10 is moved backwardly, pushing upon the link 9 and through it turning the cranks 8 and 6. The latter, pulling upon the chain 7 sufficiently in line with the line of the slides 3, will easily retract the slides of the step 2 until it lies in position close against the bottom of the lowermost permanent step.

I have found that by so placing the crank 6 that when the step is drawn up the chain or connection 5 will be in line from the crank to the step inside of the fulcrum or shaft 7, and any pull will thus be in the direction to retain the parts in place.

Having thus described my invention, what I claim, and desire to secure by Letters Patent, is—

1. The combination with a car or vehicle of permanent inclined steps, guides fixed upon the sides of the step-frame, a bar having a step fixed thereon, extending beneath the lowermost permanent step, said bar having its ends upturned and slidable in the guides, and a lever and intermediate connections by which the step and slides may be retracted, said intermediate connections including two crank-arms standing at an angle to each other and turnable about a single axis, means connecting one of said arms with said lever, and a connection between the other crank-arm and the movable step, said other crank-arm adapted to carry the said connection beyond the center of a line drawn from said axis to the movable step whereby the parts are retained substantially in a locked position.

2. The combination with a car or vehicle and steps thereof, of a supplemental step extending beneath the lowest permanent step, a bar having parallel separated sections to which the step is fixed, said sections being turned to stand parallel with the permanent step sides, guides in which the ends of the bar are slidable, a lever fulcrumed to a fixed portion of the car, a shaft, crank-arms thereon and standing one at an angle to the other, a link connecting one of said arms with the lever, and a flexible connection between the other crank-arm and the step, said other crank-arm adapted to carry the flexible connection beyond the center of a line drawn from said shaft to the movable step whereby the parts are retained in a locked position.

In testimony whereof I have hereunto set my hand in presence of two subscribing witnesses.

GEORGE F. SHAW.

Witnesses:
 H. L. BATCHELDER,
 FRANK ROBINSON.